United States Patent Office 3,222,702
Patented Dec. 14, 1965

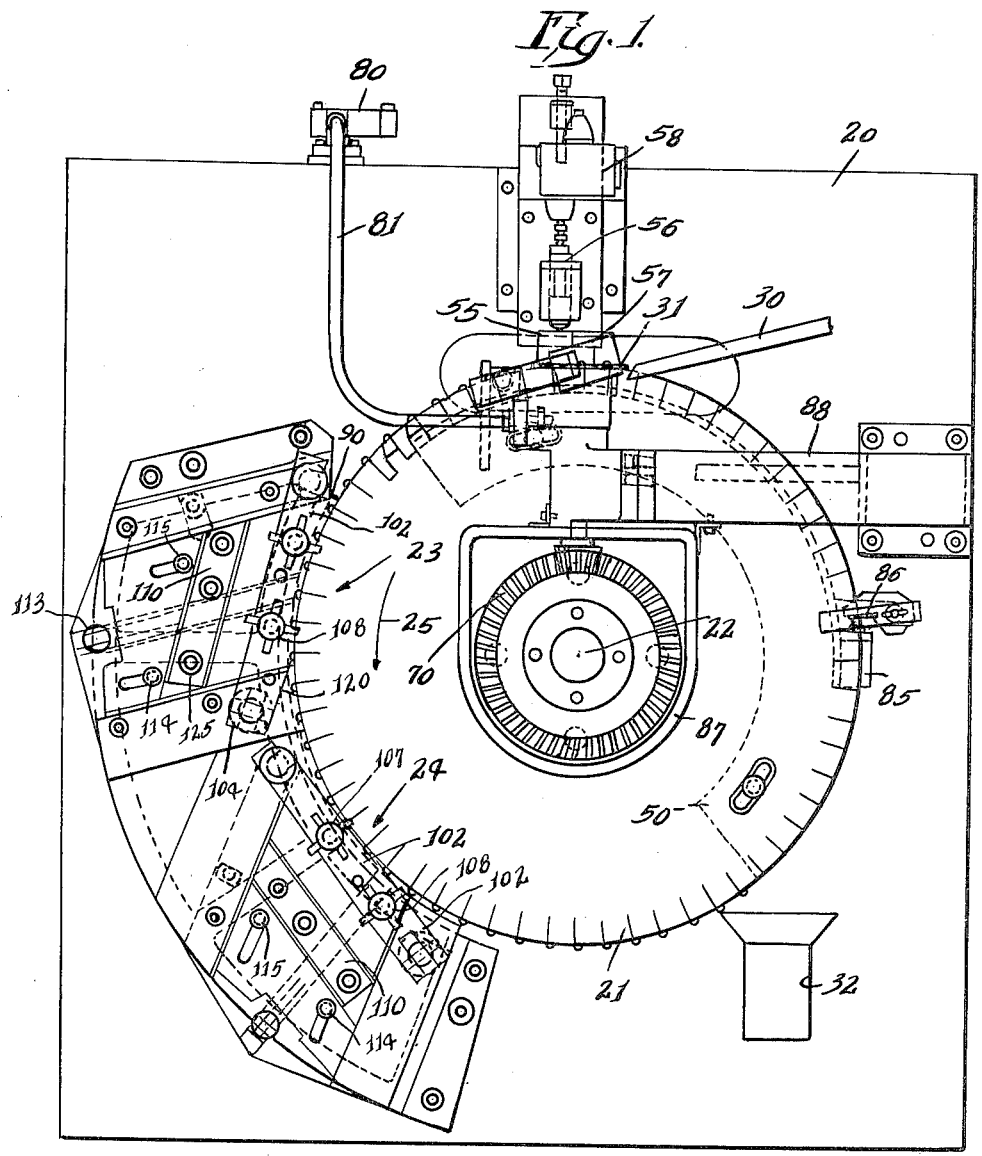

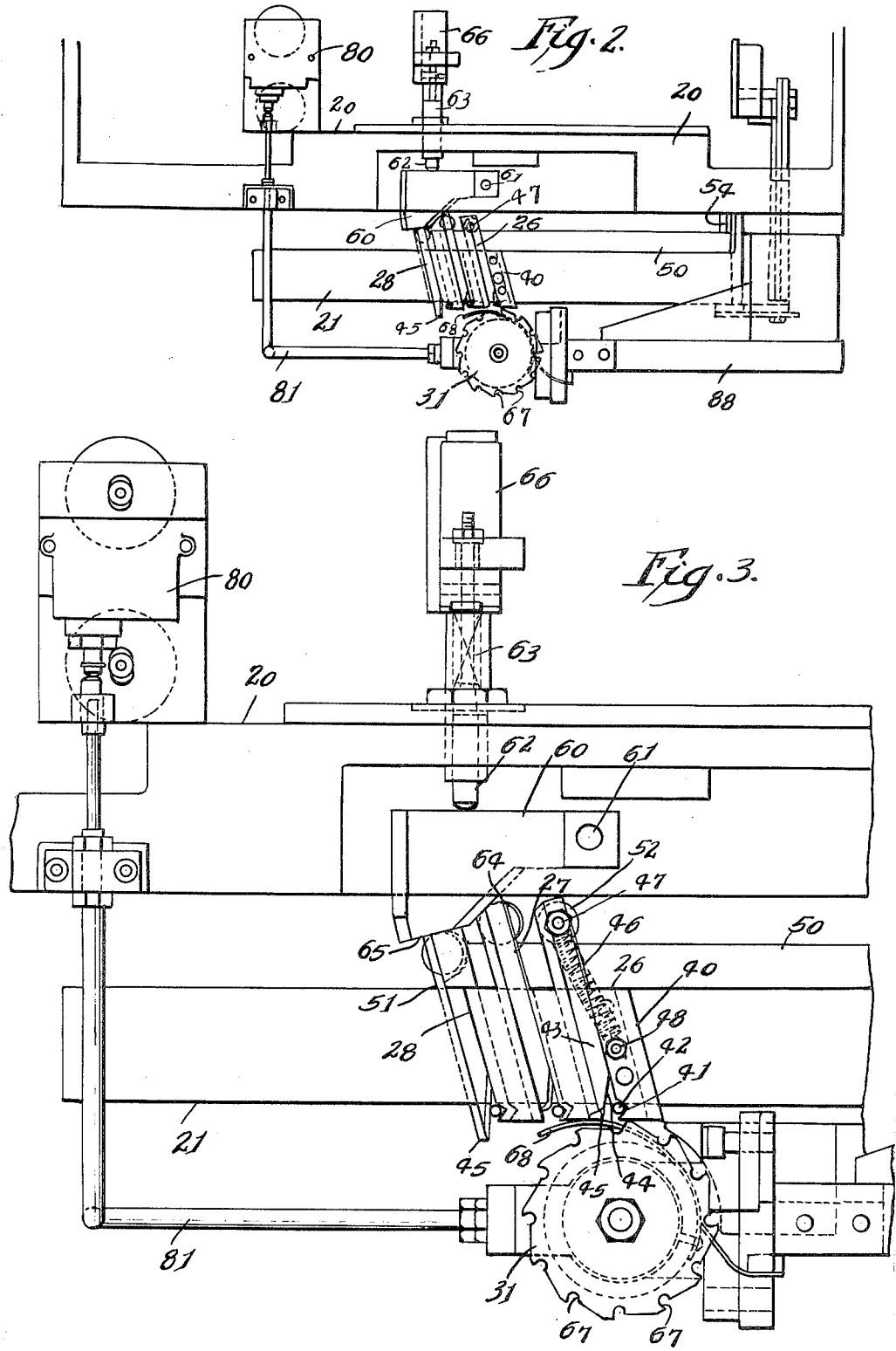

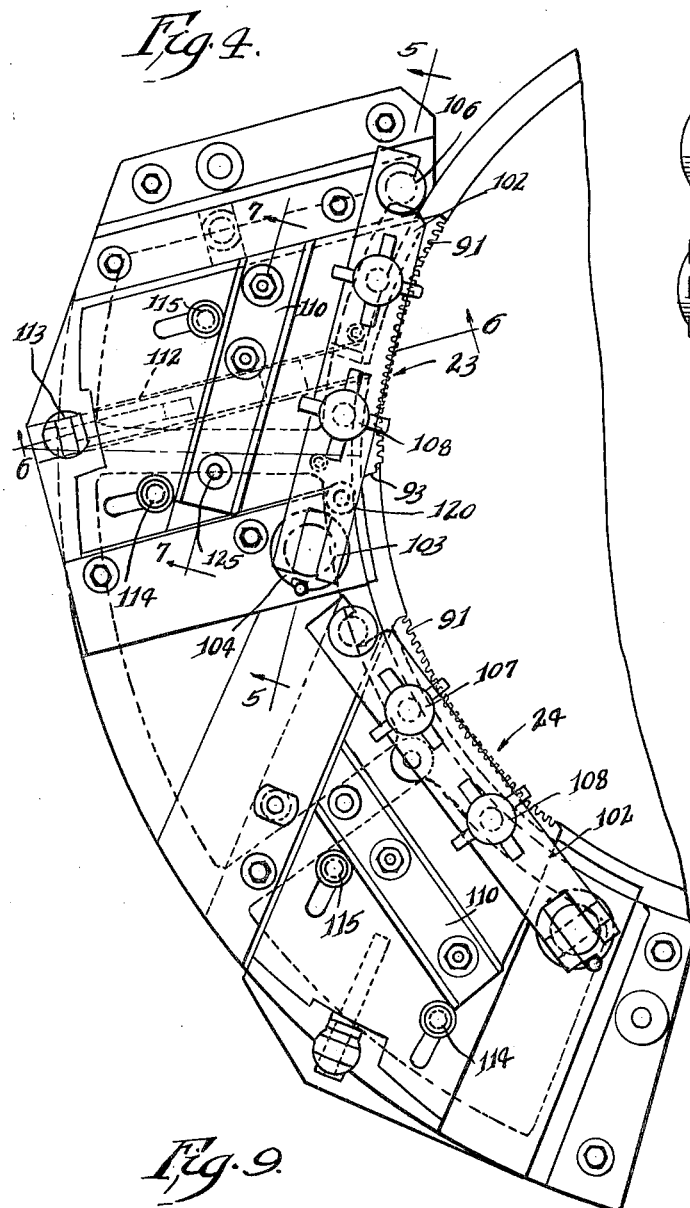
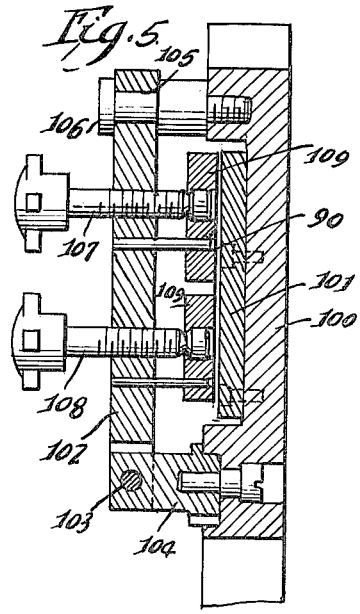
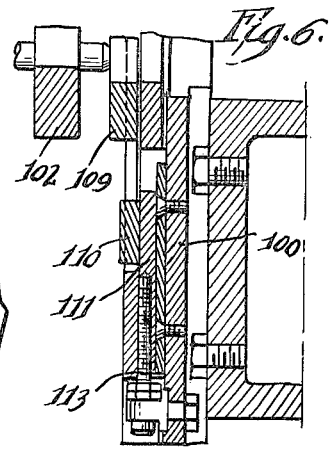
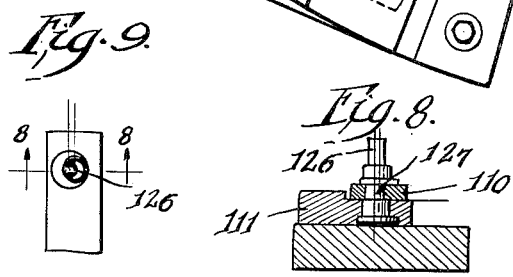
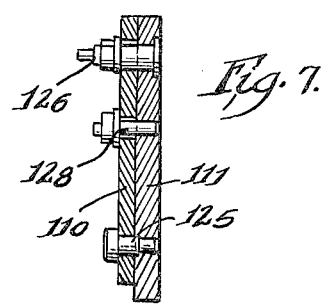

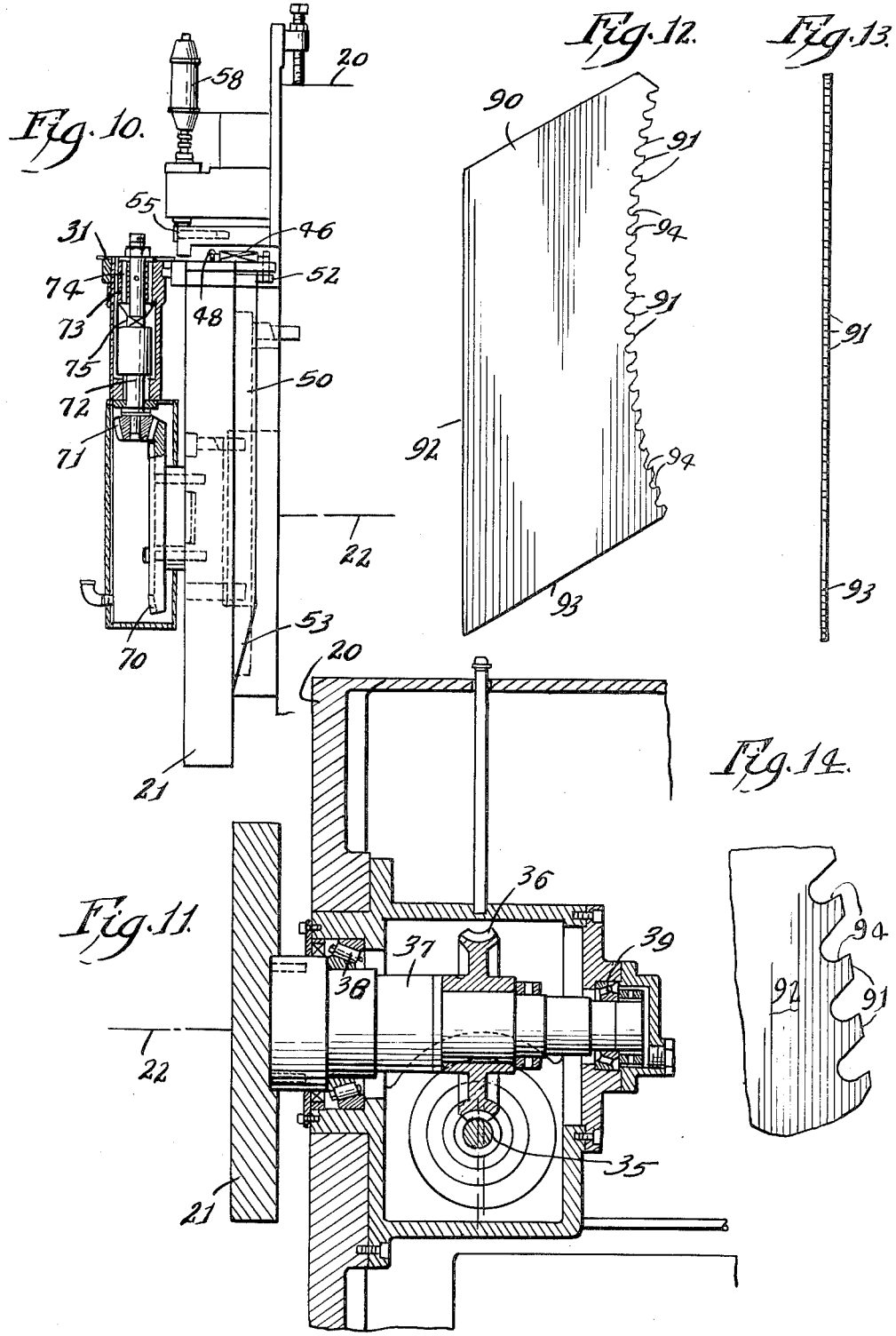

3,222,702
MACHINE FOR SLOTTING SCREW HEADS
Charles O. Lofgren and Axel Anderson, Rockford, Ill., assignors to Sundstrand Corporation, a corporation of Illinois
Filed Oct. 2, 1961, Ser. No. 142,088
3 Claims. (Cl. 10—6)

This invention relates to a machine tool and more particularly to a rotary broaching machine.

An object of this invention is to provide a new and improved rotary broaching machine.

Another object of the invention is to provide a rotary broaching machine for slotting the heads of screws which can perform the operation at the rate of several hundred screw blanks per minute.

Another object of the invention is to provide a rotary broaching machine in which the machine can handle several different sizes of workpieces without change in the machine and in which the broach may be easily replaced with a minimum of down time to effect the change.

A further object of the invention is to provide a new and improved broach having an integral blade body in which the cutting teeth define a curved cutting profile with the teeth arranged on the body of the broach and shaped to have the tooth form and location maintained identical relative to the broach holder locating surfaces during repeated sharpenings.

Further objects and advantages will become apparent from the following detailed description taken in connection with the accompanying drawings, in which:

FIGURE 1 is a front elevational view of the rotary broaching machine;

FIGURE 2 is a plan view of the work holder structure shown in FIGURE 1;

FIGURE 3 is a view similar to FIGURE 2 on an enlarged scale;

FIGURE 4 is a fragmentary front elevational view of the broach holders shown in FIGURE 1;

FIGURE 5 is a section through a part of the broach holder and taken generally along the line 5—5 in FIGURE 4;

FIGURE 6 is a fragmentary section taken generally along the line 6—6 in FIGURE 4;

FIGURE 7 is a fragmentary section taken along the lines 7—7 in FIGURE 4;

FIGURE 8 is a section taken along the line 8—8 in FIGURE 9;

FIGURE 9 is a plan view of the adjustment mechanism shown at the upper end of FIGURE 7;

FIGURE 10 is a fragmentary side elevational view of the work holding fixture shown in FIGURE 1;

FIGURE 11 is a central vertical section of the drive for the work holding fixture shown on an enlarged scale;

FIGURE 12 is a detail plan view of the blade-shaped broach;

FIGURE 13 is an end elevational view of the broach looking toward the edge having the cutting teeth; and FIGURE 14 is an enlarged fragmentary view of a portion of the cutting edge of the broach.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

As shown generally in FIGURES 1, 2 and 3, the rotary broaching machine embodies a head 20 supported on a suitable base (not shown). The head carries a rotatable work holding device 21 which rotates on an axis 22 for carrying workpieces such as screw blanks sequentially past a first broaching station, indicated generally at 23, and a second broaching station, indicated generally at 24, with the rotation of the device 21 being shown by the arrow 25. The work holding device 21 is generally in the form of a drum having about its periphery a continuous series of individual work holders or fixtures, some of which are shown at 26, 27 and 28 in FIGURES 2 and 3, which receive screw blanks from a supply having a supply chute 30 and are placed in the holders by a feed wheel 31. By rotation of the feed wheel 31, the screw blank is delivered to one of the work holders and is clamped therein with rotation of the work holding device 21 carrying the screw blank with the head exposed out on the periphery of the device through the two broach stations. The workpiece is subsequently released from the work holding device 21 for movement into a chute 32 which leads the screw blank with the head slotted to a storage container. Immediately preceding the chute 32 a driven deburring tool may be mounted to remove any burr obtained from formation of the slot in the screw head.

The work holding fixture 21 and the mechanism associated therewith are shown in FIGURES 1, 2, 3 and 10. The drum 21 is driven from a suitable source of power, such as an electric motor, driving a worm 35 (FIGURE 11) which drives a worm wheel 36 fixed to a shaft 37 coaxial with axis 22 and rotatably mounted in spaced bearings 38 and 39 in the head, and which has the drum 21 secured thereto.

Each of the individual work holders is of the same construction and embodies a first member 40 secured to the drum and having a V-shaped notch 41 facing generally in the direction of travel of the drum for receiving a workpiece 42, as shown in FIGURE 3. A second member 43 is movably mounted relative to the first member 40 and is slidably guided by suitable undercuts formed in the next adjacent work holder member 40 and the associated work holder member 40. The second member 43 has a sloped surface 44 tapering toward an exposed end 45 whereby as the second member 43 moves from the retracted position shown for the holder 26 in FIGURE 3 to the extended position shown in connection with holder 28 in FIGURE 3, the sloped surface progressively moves toward the notch 41 while the member 43 is actually moving lengthwise. With the construction of the V-shaped notch as well as the sloped surface 44 on the second member 43, the work holder is capable of holding screw blanks of varying diameters whereby different size blanks can be accomplished without any change in the set-up of the machine. The second member 43 of the work holder is yieldably urged to its extended position by a spring 46 connected between the member, as indicated at 47, and the drum, as indicated at 48. The work holder member 43 is maintained in a position to receive a workpiece by means of a stationary cam 50 located to the rear of the drum 21 and which terminates at 51, whereby a follower roller 52 on the member 43 moves off the cam to permit the spring 46 to function to extend the member to clamp a workpiece. The workpiece is held in clamped position as it passes the broaching stations 23 and 24 and when the workpiece reaches the chute 32 the cam again becomes effective with a lead-in end 53 as shown in FIGURE 10 being positioned to engage the follower roller 52 of the movable work holder member. The cam 50 is suitably secured to the frame of the machine by an attachment bracket such as indicated at 54.

There are two detection controls associated with the workpiece and the work holder, with the first of these detecting that the screw blank is properly located heightwise in the work holder. If the blank is located too high this could result in damage to the broaches. This detection is obtained by a pivoted member 55 located to be engaged by a screw located in a work holder and backed up by spring-loaded plunger 56 which is mounted for vertical movement as viewed in FIGURE 1. If a screw blank is located too high in the holder the member 55 is pivoted clockwise about a pivot 57 as viewed in FIGURE 1, to raise the plunger 56 and operate a switch 58 which is connected into the circuit for the drive motor for the machine and which, when operated, stops the motor and operates an indicator light. The second detection control obtained is to determine if a workpiece is properly clamped in the holder. This construction is shown in FIGURE 3 and embodies a member 60 pivoted at 61 and urged toward the work holders by a plunger 62 which is spring-loaded by a spring 63 engaged therewith. As will be seen in FIGURE 3, the member 60 has a first sloped surface 64 and a second sloped surface 65 which, because of the spring loading, delivers a hammer blow to the movable member 43 of the work holder to insure a tight clamped relation with a workpiece. When a movable member is given the hammer blow, the hammer member 60 is in effect driven back, and if the movable member has not moved to clamping position, the hammer member 60 will be driven back too far and the plunger 62 will indicate this position and operate the switch 66 to operate an indicator light which indicates to an operator that a part is not properly clamped and to stop the machine.

Means are associated with the camming device 21 for placing individual workpieces in the individual work holders and as shown this means comprises the feed wheel 31 which is in the form of a disc having a plurality of notches 67 about its periphery each of which can receive an individual screw blank and hold the blank therein whereby as the feed wheel rotates a screw blank in a notch 67 is delivered into a notch 41 of a work holder. Because the screw blank is headed it will seat itself and hold itself within the notches 67 which is also true with respect to the notches 41 in the work holders. Transfer of a workkpiece from a feed wheel notch 67 to a work holder notch 41 is accomplished under the urging of a flexible spring member 68 as assisted by centrifugal force imparted to the workpiece during the rotation of the feed wheel.

Means are provided for driving the feed wheel 31 in timed relation to the work holding drum 21 in order that the feed wheel notches 67 will present themselves in timed relation to the individual work holders. This means comprises a gear 70 rotatable with the drum 21 which meshes with a gear 71 fixed to a shaft 72 to which the feed wheel 31 is loosely mounted. The feed wheel is driven from the shaft 72 by a clutch mechanism embodying a member 73 pinned to the shaft and having a series of pins 74 which are spring loaded upwardly into engagement with the underside of the feed wheel 31 by a spring 75 and engage in recesses on the underside of the feed wheel. If a jam occurs in the feed wheel resulting in inability of the feed wheel to rotate, the clutch pins 74 move out of the recesses on the underside of the feed wheel against the urging of the spring 75 to disengage the drive to the feed wheel. This disengagement results in operation of a switch 80 shown in FIGURES 1, 2 and 3, which switch is actuated through a motion transmitting cable 81 to operate an indicator light and stop the machine.

One additional limit switch is provided to detect the failure of a part to drop out of the work holder after broaching, with this switch being indicated at 85 in FIGURE 1 and including a pivotal feeler 86 positioned to be engaged by a part remaining in the work holding drum 21 to shift contact with the switch to stop the drive motor and operate an indicator light in the event a part remains in the drum.

The feed wheel 31 and parts associated therewith are mounted on and within a housing 87 which is supported from the frame of the machine by an arm 88.

The broaching tool is shown in FIGURES 12–14 and embodies a generally flat blade-shaped body 90 with a series of teeth 91 along one edge thereof arranged to define a curved cutting profile with the specific form being shown as an arc of a circle. The body of the blade is shaped to have a rear edge 92 and a side edge 93 arranged at an acute angle of approximately 60° and with the side edge 93 being generally parallel to a face 94 of a cutting tooth. The back edge 92 of the blade body is generally parallel to a tangent of the curved cutting profile intermediate its ends. As shown, the teeth have a positive rake angle and have a form whereby the tooth is identical after sharpening, and also the location of the teeth is maintained identically relative to broach holder locating surfaces subsequently to be described.

Each of the broaching stations 23 and 24 is basically the same, with the second station being used only to provide a depth of cut in a workpiece greater than that provided by the first station.

Each of the broach holders 23 and 24 is similar, and the broach holder 23 will be described in detail. The broach holder embodies a frame 100 with a plate 101 against which the broach 90 rests, and the broach is held within the holder by a quick release mechanism embodying an arm 102 which is pivoted at 103 to a member 104 swivelly mounted in the frame 100. The opposite end of the arm 102 has an open ended slot 105 which fits an undercut part of a pin 106 secured in the frame 100. The arm 102 carries a pair of threaded members 107 and 108, each of which has pressure pads 109 which engage the opposite face of the broach body 90. With the parts in assembled relation as shown in FIGURES 4 and 5, the turning of the members 107 and 108 causes the pads to firmly engage the broach and to hold the arm 102 in broach clamping position. When it is desired to change a broach, the members 107 and 108 are backed off, which then frees the arm 102 for rotation about the swivel 104 until the notch 105 is released from the pin 106 and then the arm 102 may be swung about the pivot 103 to move the arm out of the way for access to the broach.

The broach in effect is held in a slot with a bottom or left-hand side of the slot as viewed in FIGURE 4 being defined by a bar 110 carried on a base 111 which is adjustably mounted on the frame 100 by means of a central key 112. The adjustment of the base 111 relative to the frame 100 is obtained by the threaded member 113, and the position is maintained by a pair of tightening bolts 114 and 115 which pass through slots in the base 111 and attach to the frame 100. The key 112 is arranged at an angle of 15° to a radian from the axis of rotation 22 for the work holding drum 21. The thrust of the broaching action is taken by a member 120 having a flat surface to engage the side edge 93 of the broach tool, and this member can rotate to maintain its contact with the edge of the broach tool even though the inclination of the broach may be varied as subsequently described. The member 110 against which the rear edge 92 of the broach engages, in addition to being movable with the holder base 111, is mounted for pivotal movement about a pivot pin 125 which is on a radial line of the work holding drum axis 22 which also passes through the last tooth 91 of the broach tool. This angular adjustment permits tilting of the tool to determine the rise per tooth and with the relation along the radial line, permits this while maintaining the setting of the last tooth for final depth of cut. The angular adjustment of the member 110 is accomplished by rotation of a pin 126 having an eccentric surface 127 engageable with the member 110. The adjustment movement is permitted by loosening of a tightening bolt 128 passing through an oversize opening in the member 110, which is of a size to avoid an interference with the angular adjustment, and when the tightening bolt is tightened the member 110 is held in an adjusted position.

The broach tool disclosed herein is the subject of a divisional application hereof.

As stated previously, the broach holder at broach station 24 is the same as the holder at station 23 and similar reference numerals have been applied thereto.

We claim:

1. In a machine tool, a cutting station, a workholding device having a plurality of workholders, means for rotationg the workholding device about an axis and relative to the cutting station to move successive workholders through said station, each of said workholders comprising, a first member having a V-shaped notch with the base of the V extending radially with respect to said axis for establishing two-point contact with a generally cylindrical workpiece of a range of sizes held extending radially of said axis and with the axis of the workpiece parallel with said base, a series of said workholders having their notches lying in a plane transverse to said axis, a second member for gripping a workpiece in said notch of the first member, said second member having an elongate gripping surface extending generally parallel to said axis, means mounting said second member for reciprocal movement along a line at a slight angle to said gripping surface and at substantially a right angle to said plane whereby advance of said second member moves said gripping surface progressively toward and across said notch, a spring connected between said second member and said device for yieldably urging said second member in advancing direction, and means for positively retracting said second member from an advanced position.

2. In a machine tool, a cutting station, a work holding device having a plurality of workholders, means for moving said device in a path through a cutting station to move successive workholders past a cutting member, each of said workholders comprising, a first member having a V-shaped notch with the base of the V coinciding with the centerline of said path whereby the notch makes two-point contact with a cylindrical workpiece within a range of sizes and with the axis of the workpiece coinciding with the centerline of said path, a second member for gripping a workpiece in the notch of said first member, said second member having a planar gripping surface extending transverse to said path, means mounting said second member for reciprocal movement along a line at slightly less than a right angle to the path whereby advance of said second member moves said gripping surface both toward and across said notch, and yieldable means for advancing said second member whereby the second member stops when a workpiece is engaged.

3. In a machine tool as defined in claim 2, a feed wheel, means for rotating the feed wheel, a plurality of notches on the periphery of the feed wheel for each receiving a workpiece for successive delivery to a workholder, means for assisting transfer of a workpiece from the feed wheel to the workholder, means for detecting the feeding of a workpiece to the workholder, means for seating said second member in firmly clamped relation with a workpiece, and means for detecting that a clamped workpiece is properly located.

References Cited by the Examiner
UNITED STATES PATENTS

| | | | |
|---|---|---|---|
| 1,021,242 | 3/1912 | Fishburne | 10—169 |
| 1,380,047 | 5/1921 | Eden | 10—107 |
| 1,527,693 | 2/1925 | Moeschl et al. | 10—72 |
| 1,872,564 | 8/1932 | Stimpson | 10—20.5 |
| 1,996,368 | 4/1935 | Drissner | 29—37 |
| 2,284,690 | 6/1942 | Stern | 10—155 |
| 2,741,783 | 4/1956 | Steinfurth | 10—120.5 |
| 2,767,623 | 10/1956 | Hanson | 10—6 |
| 2,852,788 | 9/1958 | Putetti | 10—6 |
| 2,855,656 | 10/1958 | Poynter | 29—95.1 |
| 2,946,583 | 7/1960 | Connor | 269—57 |
| 2,998,634 | 9/1961 | Raehrs et al. | 29—95.1 |
| 3,031,700 | 5/1962 | Conner | 10—107 |
| 3,111,697 | 11/1963 | Wilson | 10—6 |

FOREIGN PATENTS

| | | |
|---|---|---|
| 651,274 | 10/1928 | France. |
| 810,632 | 3/1959 | Great Britain. |

ANDREW R. JUHASZ, *Primary Examiner.*